(12) United States Patent
Serena et al.

(10) Patent No.: US 10,233,701 B2
(45) Date of Patent: Mar. 19, 2019

(54) UNDERWATER ENGAGEMENT OF TUBULAR MEMBERS

(71) Applicant: Saipem S.p.A., San Donato Milanese, Milan (IT)

(72) Inventors: Alberto Serena, Milan (IT); Diego Lazzarin, Milan (IT); Gabriele Cadeddu, Milan (IT)

(73) Assignee: SAIPEM S.P.A., Milan (IT)

( * ) Notice: Subject to any disclaimer, the term of this patent is extended or adjusted under 35 U.S.C. 154(b) by 0 days.

(21) Appl. No.: 15/532,878

(22) PCT Filed: Dec. 4, 2015

(86) PCT No.: PCT/EP2015/078738
§ 371 (c)(1),
(2) Date: Jun. 2, 2017

(87) PCT Pub. No.: WO2016/087671
PCT Pub. Date: Jun. 9, 2016

(65) Prior Publication Data
US 2017/0356254 A1    Dec. 14, 2017

(30) Foreign Application Priority Data
Dec. 5, 2014 (GB) .................................. 1421718.6

(51) Int. Cl.
*F16L 1/12* (2006.01)
*E21B 17/10* (2006.01)
(Continued)

(52) U.S. Cl.
CPC .......... *E21B 17/1078* (2013.01); *E21B 19/24* (2013.01); *E21B 33/038* (2013.01);
(Continued)

(58) Field of Classification Search
CPC .... E21B 33/038; E21B 17/1078; F16L 1/123; F16L 3/205
See application file for complete search history.

(56) References Cited

U.S. PATENT DOCUMENTS

| | | | | |
|---|---|---|---|---|
| 3,142,343 A | * | 7/1964 | Otteman | .................. E21B 7/128 166/355 |
| 3,528,497 A | * | 9/1970 | Lehman | .................. E21B 7/128 166/360 |

(Continued)

FOREIGN PATENT DOCUMENTS

| | | |
|---|---|---|
| CN | 202249836 U | 5/2012 |
| GB | 992347 A | 5/1965 |

(Continued)

OTHER PUBLICATIONS

Search Report dated Mar. 27, 2015, by the United Kingdom Intellectual Property Office in corresponding United Kingdom Patent Application No. 1421718.6. (4 pages).
(Continued)

*Primary Examiner* — James G Sayre
(74) *Attorney, Agent, or Firm* — Buchanan Ingersoll & Rooney PC (57) ABSTRACT

A connection assembly for engaging a tubular member underwater to restrain the tubular member from radial movement relative to the connection assembly includes a plurality of pads for engaging the tubular member at circumferentially spaced positions; and a plurality of biasing arrangements, each for biasing a respective pad radially inwardly into engagement with the tubular member; wherein each biasing arrangement includes a pre-loadable, mechanical, compressed spring arrangement for resiliently pressing its respective pad against the tubular member. The assembly need not employ any hydraulic components.

24 Claims, 5 Drawing Sheets

(51) Int. Cl.
  *E21B 19/24* (2006.01)
  *E21B 41/00* (2006.01)
  *F16L 3/205* (2006.01)
  *E21B 33/038* (2006.01)

(52) U.S. Cl.
  CPC .......... *E21B 41/0007* (2013.01); *F16L 1/123* (2013.01); *F16L 3/205* (2013.01)

(56) References Cited

U.S. PATENT DOCUMENTS

| | | | |
|---|---|---|---|
| 3,606,393 A * | 9/1971 | Huntsinger et al. | E21B 17/085 285/308 |
| 4,012,059 A * | 3/1977 | Luke | E21B 33/038 285/18 |
| 4,136,633 A | 1/1979 | Homer et al. | |
| 4,867,612 A | 9/1989 | Bassett | |
| 5,172,613 A | 12/1992 | Wesch, Jr. | |
| 5,595,248 A | 1/1997 | Denny | |
| 8,561,707 B2 * | 10/2013 | Jin | C23C 14/024 166/242.4 |
| 2004/0200622 A1 | 10/2004 | Jennings | |
| 2011/0094748 A1 | 4/2011 | Reddy | |

FOREIGN PATENT DOCUMENTS

| | | | | |
|---|---|---|---|---|
| GB | 1595345 A | * | 8/1981 | ............. F16L 11/18 |
| GB | 2481910 A | | 1/2012 | |
| SU | 1002566 A1 | | 3/1983 | |

OTHER PUBLICATIONS

International Search Report (PCT/ISA/210) dated Feb. 4, 2016, by the European Patent Office as the International Searching Authority for International Application No. PCT/EP2015/078738.

Written Opinion (PCT/ISA/237) dated Feb. 4, 2016, by the European Patent Office as the International Searching Authority for International Application No. PCT/EP2016/078738.

* cited by examiner

UNDERWATER ENGAGEMENT OF TUBULAR MEMBERS

FIELD OF THE INVENTION

The present invention relates to a connection assembly for engaging a tubular member underwater to restrain the tubular member from radial movement. The invention also relates to a method of engaging a tubular member underwater.

BACKGROUND OF THE INVENTION

In the offshore oil and gas industry and in similar technologies it is common to provide tubular members of various kinds extending down into the sea bed. An underwater structure is often provided, for example, on the seabed for restraining and/or guiding movement of the tubular member. Such arrangements may apply in a wide variety of circumstances and in some of those circumstances the structure is desired to restrain the tubular member passing through it from radial movement relative to the structure. Typically in the offshore industry, the forces which the restraint is required to resist are very high and conventionally such forces are provided by hydraulic systems. It is possible to devise a very simple hydraulic system for providing such radial restraint and for accommodating a very substantial radial force. For example pads may be pressed radially inwardly against a tubular member by respective hydraulic piston and cylinder arrangements with the pressure of the hydraulic fluid controlled to control the radial force. A difficulty with such an approach is that the reliability of a hydraulic system is most likely to become an issue over time and some maintenance of a hydraulic system is most likely to be required. That maintenance is expensive when the system is in an underwater environment.

The present invention seeks to mitigate the above-mentioned problem.

SUMMARY OF THE INVENTION

The present invention provides a connection assembly for engaging a tubular member underwater to restrain the tubular member from radial movement relative to the connection assembly, the connection assembly comprising:

a plurality of pads for engaging the tubular member at circumferentially spaced positions;

a plurality of biasing arrangements, each for biasing a respective pad radially inwardly into engagement with the tubular member;

wherein each biasing arrangement comprises a pre-loadable, mechanical, compressed spring arrangement for resiliently pressing its respective pad against the tubular member.

By providing spring arrangements that are mechanical and therefore do not require hydraulic fluid and/or any hydraulic components, it becomes possible to provide an arrangement requiring little or no maintenance, even over a period of 30 years.

A tubular member will in the majority of applications be hollow and of circular cross-section but it should be understood that it is within the scope of the invention for the tubular member to be solid and/or of non-circular cross-section.

In some applications it may be desirable that the connection assembly is arranged for allowing axial movement of the tubular member relative to the connection assembly. The movement may be, but is not necessarily, of limited amplitude. In such a case, each pad preferably has a low-friction surface for engaging the tubular member. The coefficient of friction between the low friction surface and the tubular member is preferably less than 0.2 and more preferably less than or equal to 0.1. The low friction surface may be constructed from a polymer blend which may be a synthetic polymer blend. The low friction surface may be constructed from the material sold under the trade mark Orkot® TLMM Marine by the company Trelleborg Sealing Solutions UK Ltd.

Since the pads are, in use, pressed against the tubular member under the action of a pre-load, which may be constant, it is preferred that the pads are equiangularly spaced around the tubular member. For example, if two pads are provided, they would preferably be diametrically opposite one another. In a preferred embodiment of the invention, three pads are provided at circumferentially equispaced positions. This provides a well-balanced arrangement.

Preferably each pad is mounted on a spherical joint. That allows the pad to self-adjust, in use, to match precisely the exterior surface of the tubular member that it is pressed against. Since the amount of adjustment may be of a small angle only, the spherical joint may comprise a small portion only of a sphere.

A particular advantage of employing a mechanical spring arrangement is that it is possible to avoid any pressurised hydraulic systems in the assembly and thus avoid the maintenance issues associated with such an assembly. Accordingly it is preferred that no pressurised hydraulic system is present in the connection assembly.

At least one of the compressed spring arrangements, preferably each compressed spring arrangement, may be compressed between, at a first end, its respective pad and, at a second opposite end, a stop. The compressed spring arrangement may directly abut each of the stop and the pad, but it is also possible that one or more intermediate members may be placed between the first end of the compressed spring arrangement and the pad, and/or between the second end of the compressed spring arrangement and the stop.

The position of the stop relative to the pad is preferably adjustable. That provides a simple way of adjusting the degree of compression in the compressed spring arrangement and therefore the force with which the compressed spring arrangement presses, in use, against the tubular member. A screw threaded member may be provided for defining the position of the stop. Screwing of the screw threaded member may move it in a radial direction. Whilst it is possible for the stop to be formed integrally with the screw threaded member, it is preferred that the stop is separate from the screw threaded member, with the stop being pressed, in use, against the screw threaded member which thereby defines the position of the stop. A further screw threaded locking member may be provided for screwing along the same thread as the screw threaded member to lock the screw threaded member in the position that defines the position of the stop.

The screw thread of the screw threaded member defining the position of the stop and/or of the screw threaded locking member may be trapezoidal. The screw threaded surface of the thread may be treated to lower the coefficient of friction between contacting surfaces. The screw threaded surface of the thread may be treated with a high velocity oxygen fuel (HVOF) coating. The HVOF coating may comprise molybdenum. The HVOF coating may comprise cobalt. Such spray-based deposition techniques may improve the surface properties of materials and may increase their lifespan in highly corrosive or hard-wearing environments.

Said at least one compressed spring arrangement, and preferably each compressed spring arrangement, is also preferably engageable by a further member to effect pre-loading of the compressed spring arrangement. The further member may be arranged for linear movement. Such linear movement may in a typical application require a high force because the pre-loading of the spring will often need to be high. Preferably the linear movement is obtained by use of a hydraulic system. Using a hydraulic system for preloading does not necessitate the inclusion of a hydraulic system in the final assembly: the hydraulic system may be used for the pre-loading and then removed. Whilst it is possible for the stop to be formed integrally with the further member, it is preferred that the stop is separate from the further member. Thus the stop may be a separate member from the screw threaded member and/or the further member. The further member preferably engages the compressed spring arrangement without engaging the stop.

The connection assembly according to the invention may have an initial state in which the compressed spring arrangements, are not yet pre-loaded and the compression spring(s) not yet compressed. Then, as indicated above they may be compressed to become pre-loaded; thus each pre-loadable, mechanical, compressed spring arrangement may be loaded.

As already indicated, for many applications a substantial preload is preferred. Thus, each pre-loadable, mechanical, compressed spring arrangement may be pre-loadable to a force of more than 100 kN, more preferably to a force of more than 400 kN. In an embodiment of the invention described below, each spring is pre-loadable to a force of more than 750 kN.

The present invention further provides an underwater connection system including a connection assembly as defined above and a tubular member passing through the connection assembly, the pads of the connection assembly resiliently engaging the tubular member.

The tubular member may comprise a circumferential collar around the exterior of the member and the pads may engage the collar. The collar may be integral with the tubular member or may be a separate member fixed to the tubular member. When axial movement of the tubular member relative to the pads is allowed, that movement may be limited such that the pads remain in engagement with the collar.

The present invention still further provides a method of engaging a tubular member underwater, the method comprising the following steps:

providing a connection assembly as defined above with a tubular member passing through the assembly;

subsequently compressing each pre-loadable, mechanical, compressed spring arrangement to generate a resilient compression in the spring arrangements and bias the pads against the tubular member.

The compressed spring arrangements are preferably compressed to generate a preload by ancillary equipment. The ancillary equipment may comprise hydraulic equipment. The ancillary equipment may be connected to one part of the connection assembly to preload one compressed spring arrangement and subsequently disconnected from the connection assembly and connected to another part of the connection assembly to preload another compressed spring arrangement. With the preload applied to a compressed spring arrangement, the connection assembly may be adjusted to hold the preload in the spring. The ancillary equipment may then be removed. The ancillary equipment may be mounted on a remotely operated underwater vehicle (ROV).

In use each spring arrangement preferably applies a force of more than 100 kN, more preferably more than 400 kN, onto the tubular member.

It will of course be appreciated that features described in relation to the apparatus of the present invention may be incorporated into the method of the invention and vice versa.

DESCRIPTION OF THE DRAWINGS

An embodiment of the present invention will now be described by way of example only with reference to the accompanying schematic drawings, of which.

DETAILED DESCRIPTION

Figure 1:
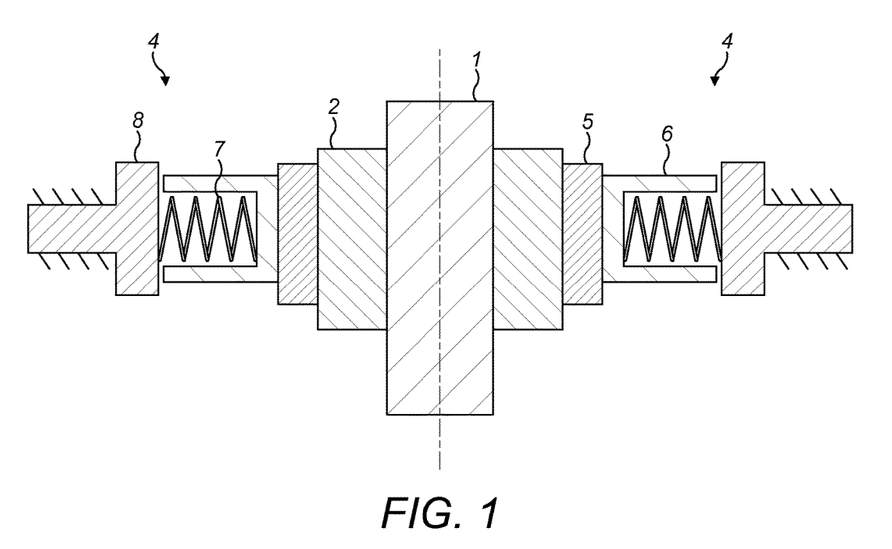
FIG. 1 is a cross-sectional diagrammatic view of a connection assembly and tubular member.

FIG. 1 shows diagrammatically an underwater connection system embodying the invention. A tubular member 1 having a collar 2 fixed thereto is to be held in place by a connection assembly which in diagrammatic FIG. 1 is shown as comprising a pair of sub-assemblies 4 on opposite sides of the tubular member 1. Each sub-assembly comprises a pad 5, a compressed spring assembly comprising a spring casing 6 and a spring 7 and an external structure 8 which is fixed in space, for example to the sea-floor.

The springs 7 of each compressed spring assembly are pre-loaded so that there is a substantial spring pressure, in one particular example 750 kN, pressing each pad 5 against the collar 2 of the tubular member 1. In that way the tubular member is resiliently located in a horizontal plane. The faces of the pads 5 in contact with the collar 2 are provided with low friction surfaces to allow vertical (axial)sliding movement of the collar 2 relative to the pads 5. In a particular example, the faces of the pads 5 are constructed from the synthetic polymer blend sold under the trade mark Orkot® TLMM Marine by the company Trelleborg Sealing Solutions UK Ltd. Typically such sliding movement would be at low relative velocity and of small amplitude but would allow for some longitudinal displacement of the tubular member relative to the connection assembly.

Figure 2:
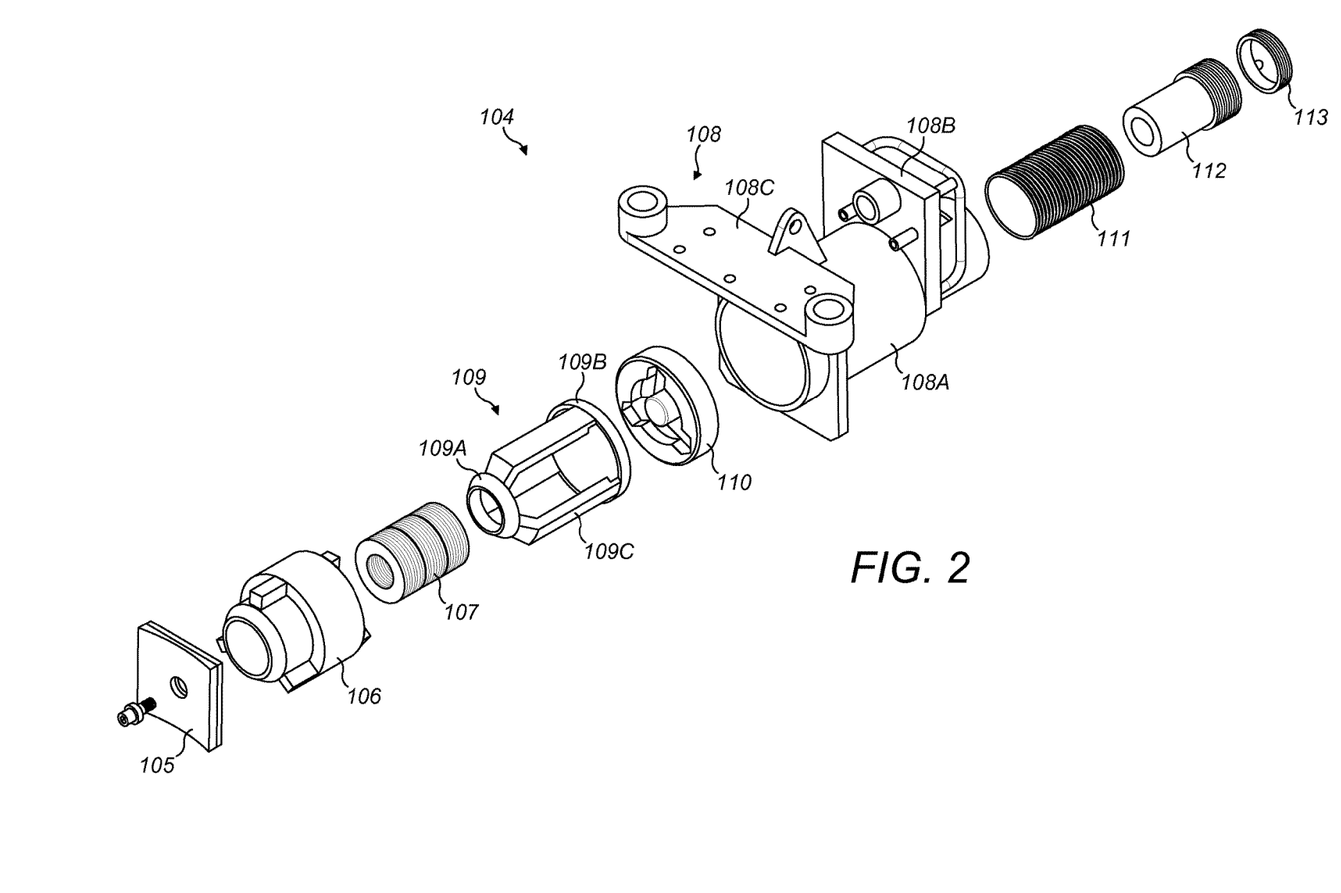
FIG. 2 is an exploded view of the connection assembly of FIG. 1.

Referring now to FIG. 2, the structure of an exemplary form 104 of one of the sub-assemblies 4 shown in FIG. 1 will now be described. The sub-assembly generally comprises: an external structural body 108; a pad 105; a compressed spring assembly comprising a spring casing 106 and a pre-loadable compressed spring pack 107; a pre-loading member 109; a piston 110; an override ring nut 111; a ring nut 112 and a locking ring nut 113.

Figure 3:
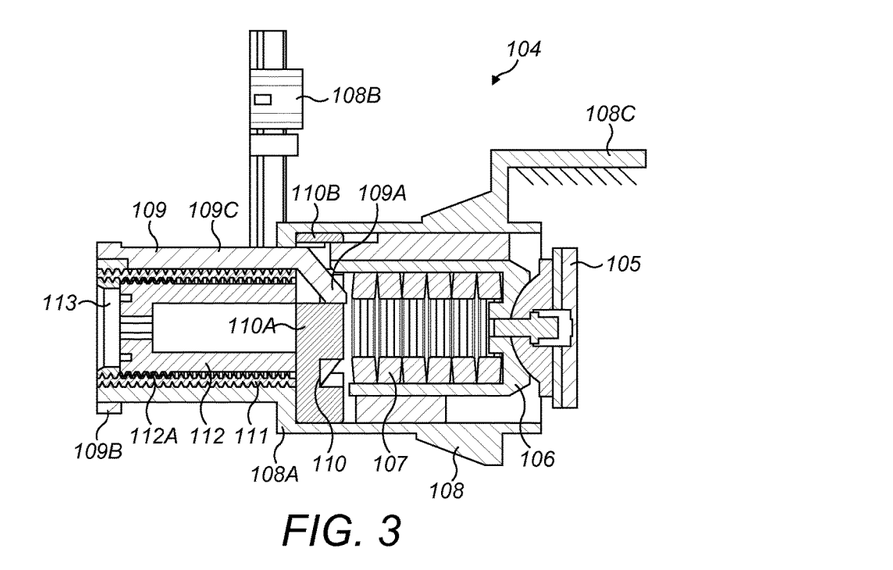
FIGS. 3 to 7 are sectional views of the connection assembly showing the state of the assembly as the assembly is pre-loaded and prepared for use.

FIG. 3 shows the sub-assembly 104 in a first assembled state. In this state, the pre-loadable compressed spring pack 107 is not compressed but sits snugly within its casing 106. The pad 105 is mounted in a front end of the casing 106 and has a curved front face to match the curvature of the collar 2 (FIG. 1). Part spherical confronting faces of the casing 106 and a rear part of the pad 105 define a mounting that allows for small arcuate movements of the pad relative to the collar 2 to allow for accurate alignment of the front face of the pad 105 and the periphery of the collar 2.

The spring casing 106 is slidably mounted within the external structural body 108 and is open at its rear end to allow the rear end of the spring pack 107 to be engaged for loading the spring pack. The rear end of the spring pack 107 is engageable by both the pre-loading member 109 and the piston 110 but in the condition shown in FIG. 3, neither of those members applies a load to the spring pack. The pre-loading member 109 is of an open construction to accommodate other parts within it, has an annular front end 109A for engaging the spring pack and an external rear end 109B, accessible to an external tool. The front end 109A and the rear end 109B are connected by three equiangularly spaced arms 109C. The pre-loading member 109 is slidably mounted in the external structural body 108 for linear movement towards and away from the spring pack 107.

In a particular example, the spring pack 107 comprises a series of Belleville washers, but it will be understood that a variety of suitable arrangements for the spring pack may be employed.

The piston 110 is generally ring-shaped with a central inner portion 110A connected to an outer portion 110B by three arms. The central inner portion 110A of the piston 110 is therefore able to pass through the front end 109A of the pre-loading member 109 for engaging the spring pack 107. The periphery of the piston 110 is slidably mounted in the external structural body 108 for linear movement towards and away from the spring pack 107.

The ring nut 112 is positioned immediately to the rear of the piston 110. The ring nut 112 has an externally threaded rear portion 112A which threadedly engages an internal thread on the override ring nut 111 which in turn has an external thread which threadedly engages an internal thread on the external structural body 108.

The locking ring nut 113 is positioned to the rear of the ring nut 112 and has an external thread which threadedly engages the same internal thread on the override ring nut 111 as is engaged by the ring nut 112.

In a particular example, the screw threads of the threaded surfaces within the sub-assembly are trapezoidal, the base material of the threads is F22 grade steel, and the threads are treated with a high velocity oxygen fuel (HVOF) coating to increase their corrosion and wear resistance.

The external structural body 108 has a central portion 108A of generally cylindrical shape in which the spring casing 106, spring pack 107, pre-loading member 109, piston 110, ring nut 112, override ring nut 111, and locking ring nut 113 are received. Projecting from the rear of the central portion 108A is a docking portion 108B onto which an ROV (not shown) can dock, holding the ROV in fixed relationship to the external structural body 108. Projecting forwardly from the front of the external structural body is a fastening plate 108C by which the external structural body is fixed, for example by bolts, to a structure (not shown but indicated by diagonal lines below the plate 108C in FIG. 3). The nature of that structure will depend upon the particular application; for example, if the connection assembly is installed at a wellhead, the structure may be a central annular portion of subsea wellhead bracing fixed on the seabed and through which the tubular member 1 (for example a casing or other conductor) passes.

As will already be understood, a plurality of the sub-assemblies 104 are provided around the path of the tubular member 1. In the diagrammatic view of FIG. 1 two diametrically opposite assemblies are shown. In a preferred embodiment of the invention three sub-assemblies 104 are provided, spaced 120 degrees apart around the tubular member.

FIG. 3 shows the sub-assembly 104 in an initial condition in which it would be installed. In this condition the pad 105 lies spaced from the collar 2 of the tubular member. In order to arrive at a fully installed arrangement, the following steps are carried out.

Figure 4:
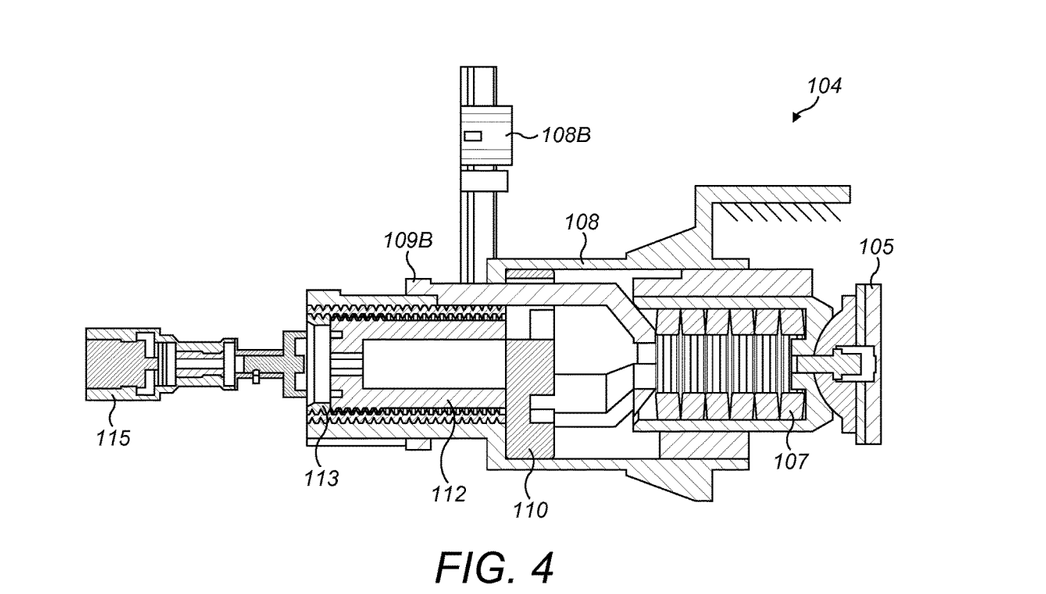

Firstly, an ROV is docked on the docking portion 108B of the external structural body 108. A tool on the ROV then engages the rear portion 109B of the pre-loading member 109 and through a hydraulic cylinder of the tool drives the pre-loading member 109 forwards into engagement with the rear end of the spring pack 107 and towards the tubular member. This action both drives the spring casing forwards to the limit of its forward movement and then compresses the spring pack. The degree of compression (pre-loading) of the spring pack 7 is readily controlled according to the hydraulic pressure in the hydraulic tool. The state of the sub-assembly after this operation is shown in FIG. 4. It may be noted that the piston 110 is now spaced from the spring pack. In a particular example of the invention the pre-loading member is driven a total distance of 250 mm in this step.

Figure 5:
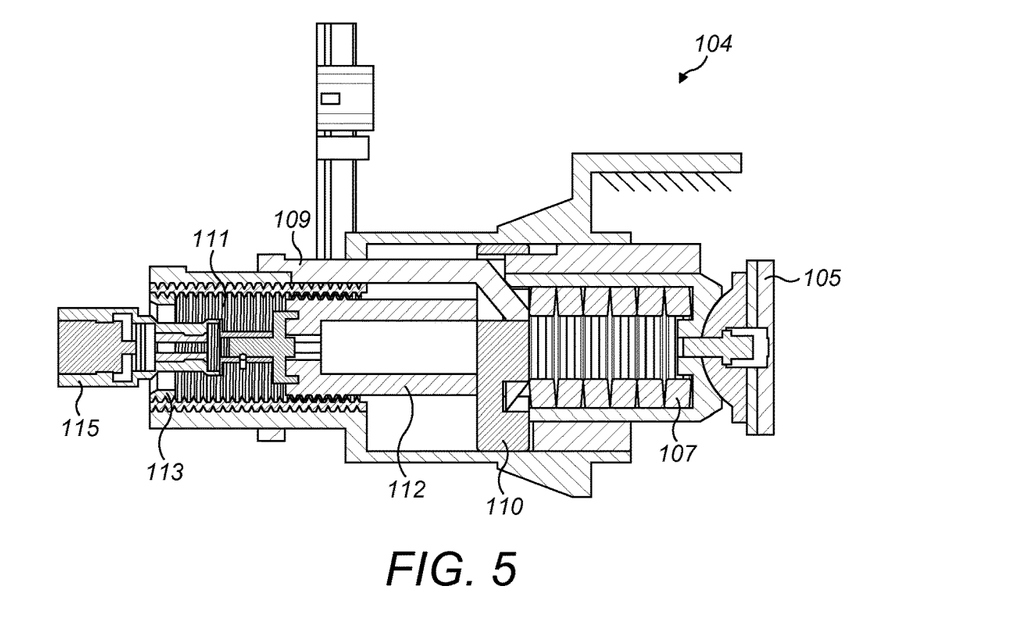

Secondly, with the ROV still docked and the loading still applied to the spring pack 107 via the pre-loading member 109, a rotary tool 115 on the ROV is engaged with the rear end of the ring nut 112 and rotates the ring nut screwing it forwards within the override ring nut 111. Referring now also to FIG. 5, the forward movement of the ring nut 112 drives the (unloaded) piston 110 forwards until it comes into contact with the rear end of the spring pack 107. At that stage rotation of the ring nut 112 is halted and the state of the sub-assembly after this operation is shown in FIG. 5. In this condition of the sub-assembly, the rearward reaction force of the loaded spring pack 7 is still borne by the pre-loading member 109. The rotary tool 115 is then retracted.

Figure 6:
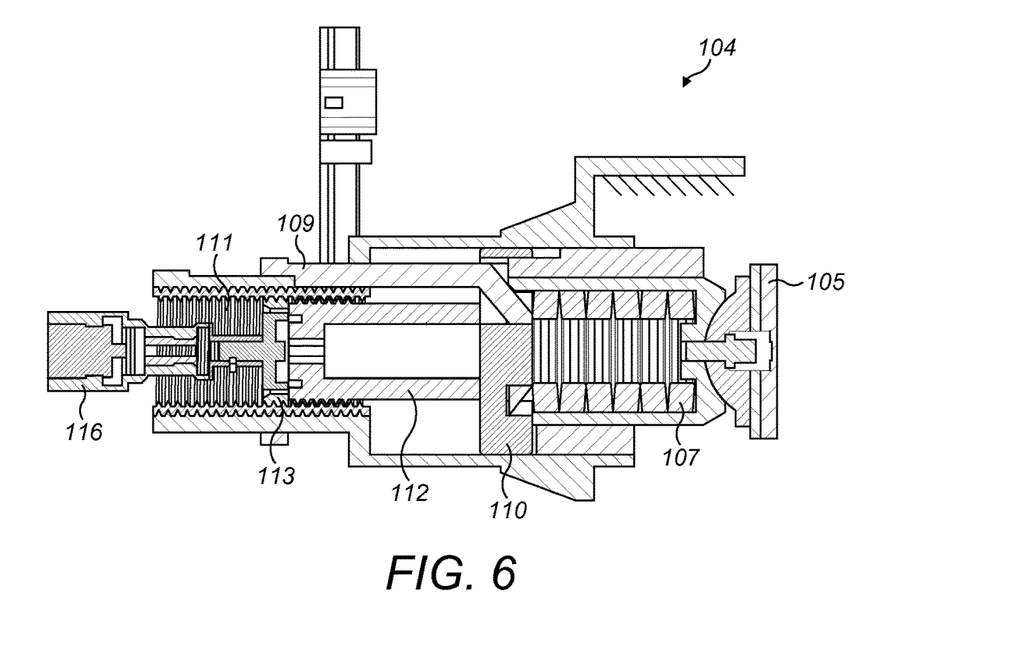

Thirdly, referring also to FIG. 6, with the ROV still docked and the loading still applied to the spring pack 107 via the pre-loading member 109, a rotary tool 116 (essentially the tool 115 shown in FIG. 5 but with a different tool head employed although in other embodiments the same tool head may be employed in a different engagement position) on the ROV is engaged with the locking ring nut 113 and rotates the locking ring nut 113 screwing it forwards within the override ring nut 111 until it contacts the ring nut 112, locking the ring nut 112 in its position. The state of the sub-assembly after this operation is shown in FIG. 6. The rotary tool 116 is then retracted.

Figure 7:
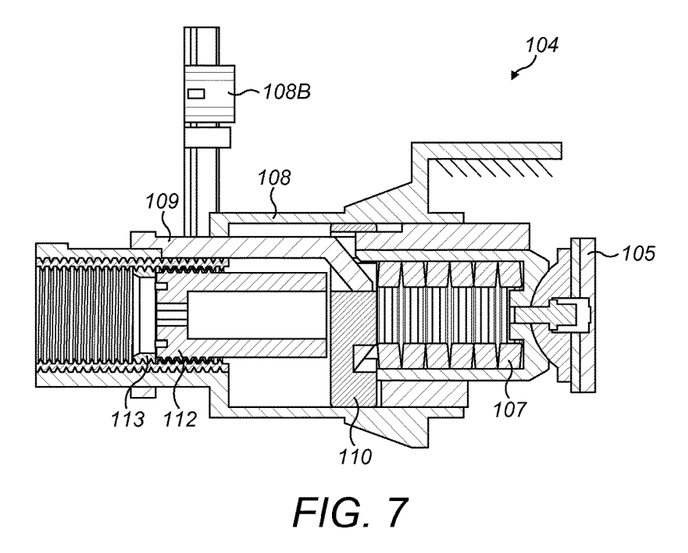

Fourthly, referring also to FIG. 7, with the ROV still docked, the loading applied to the spring pack 107 via the pre-loading member 109 is reduced gradually to zero by retracting the pre-loading member 109. The spring pack 107 is, however, prevented from extending by the engagement of the piston 110 with the rear end of the spring pack 107, the piston 110 in turn being held in position by the ring nut 112; thus the rearward reaction force of the loaded spring pack 107 is now taken via the piston 110 by the ring nut 112 which thus acts as a stop (with the locking ring nut 113 ensuring the maintenance of that stop position). The state of the sub-assembly after this operation is shown in FIG. 7. It may be noted that the pre-loading member 109 is now slightly spaced from the spring pack 107.

Finally the ROV is undocked from the docking portion 108B of the external structural body 108.

The sequence of operations described above relate to only one sub-assembly. In order to avoid unbalanced forces on the tubular member it is preferred that all three of the sub-assemblies are operated upon simultaneously. That may be achieved by using three ROVs or by using a single ROV and two slave tools that are docked on docking portions 108B of respective external structural bodies 108 and are controlled by the single ROV.

It will be noted that in the operations described above, the override ring nut 111 merely acts as an integral part of the external structural body 108. In normal operation it has no function, but in the event of failure of a sub-assembly 104, it may be rotated by a tool on an ROV to retract the ring nut 112 and locking ring nut 113 and thereby firstly remove the load on the spring pack 107 and, upon further rotation, to detach all three ring nuts from the external structure allowing access into the structure.

The embodiment of the invention described above provides a connection assembly which is able to apply very substantial radial forces on a tubular member using mechanical spring arrangements and without requiring any permanent installation of pressurised hydraulic systems. Consequently, the maintenance requirement associated with hydraulic systems is eliminated. At the same time the benefit of using a hydraulic system to apply the substantial radial forces in the first place is retained.

A connection assembly as described above can be designed to operate on the seabed for 30 years without maintenance.

Whilst the present invention has been described and illustrated with reference to one particular embodiment, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A structure for restraining movement of a tubular member, said tubular member extending into the seabed, the structure comprising:
   a plurality of pads for engaging the tubular member at circumferentially spaced positions;
   a plurality of biasing arrangements, each for biasing a respective pad radially inwardly into engagement with the tubular member;
   the structure thereby being configured such that, in use, radial movement of the tubular member relative to the structure is restrained by the plurality of pads in engagement with the tubular member;
   wherein each biasing arrangement comprises a pre-loadable, mechanical, compressible spring arrangement for resiliently pressing its respective pad against the tubular member and a pre-loader configured to engage each compressible spring arrangement to effect pre-loading of each compressible spring arrangement.

2. The structure according to claim 1, in which the structure is arranged for allowing axial movement of the tubular member relative to the structure.

3. The structure according to claim 2, in which each pad has a low-friction surface for engaging the tubular member.

4. The structure according to claim 3, in which each low-friction surface is constructed from a polymer blend.

5. The structure according to claim 1, in which three pads are provided at circumferentially equispaced positions.

6. The structure according to claim 1, in which each pad is mounted on a spherical joint.

7. The structure according to claim 1, in which no pressurised hydraulic system is present in the structure.

8. The structure according to claim 1, in which at least one of the compressible spring arrangements is compressed between, at a first end, its respective pad and, at a second opposite end, a stop.

9. The structure according to claim 8, in which the position of the stop relative to the pad is adjustable.

10. The structure according to claim 9, in which a screw threaded member is provided for defining the position of the stop.

11. The structure according to claim 10, in which the screw thread of the screw threaded member is trapezoidal.

12. The structure according to claim 10, in which the screw threaded surface of the screw threaded member has been treated to lower the coefficient of friction between contacting surfaces.

13. The structure according to claim 10, in which the screw threaded surface of the screw threaded member has been treated with a high velocity oxygen fuel (HVOF) coating.

14. The structure according to claim 1, in which the further member is arranged for linear movement.

15. The structure according to claim 1, in which the further member engages the compressible spring arrangement without engaging the stop.

16. The structure according to claim 1, in which each pre-loadable, mechanical, compressible spring arrangement is loaded.

17. The structure according to claim 1 in which each pre-loadable, mechanical, compressible spring arrangement is pre-loadable to a force of more than 100 kN.

18. An underwater connection system including the structure according to claim 1 and a tubular member passing through the structure, the pads of the structure resiliently engaging the tubular member.

19. The underwater connection system according to claim 18, in which the tubular member comprises a circumferential collar around the exterior of the member and the pads engage the collar.

20. A method of engaging a tubular member underwater, said tubular member extending into the seabed, the method comprising the following steps:
   providing a structure at the seabed for restraining movement of the tubular member, comprising:
      a plurality of pads for engaging the tubular member at circumferentially spaced positions;
      a plurality of biasing arrangements, each for biasing a respective pad radially inwardly into engagement with the tubular member;
      the structure thereby being configured such that, in use, radial movement of the tubular member relative to the structure is restrained by the plurality of pads in engagement with the tubular member;
      wherein each biasing arrangement comprises a pre-loadable, mechanical, compressible spring arrangement for resiliently pressing its respective pad against the tubular member;
   subsequently compressing each pre-loadable, mechanical, compressible spring arrangement to generate a resilient compression in the spring arrangements and bias the pads against the tubular member so that radial movement of the tubular member relative to the structure is restrained by the plurality of pads in engagement with tubular member.

21. The method according to claim 20, in which the spring arrangements are compressed to generate a preload by ancillary equipment.

22. The method according to claim 21, in which the ancillary equipment comprises hydraulic equipment.

23. The method according to claim 21, in which, with the preload applied to a spring arrangement, the structure is adjusted to hold the preload in the spring and the ancillary equipment is then removed.

24. The method according to claim 20, in which each spring arrangement applies a force of more than 100 kN onto the tubular member.

* * * * *